United States Patent
Kusumoto et al.

(10) Patent No.: US 10,080,099 B2
(45) Date of Patent: Sep. 18, 2018

(54) CELLULAR ENABLED RESTRICTED ZONE MONITORING

(71) Applicant: Raytheon Company, Waltham, MA (US)

(72) Inventors: Warren W. Kusumoto, Los Alamitos, CA (US); Uma Jha, Tustin, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/141,719

(22) Filed: Apr. 28, 2016

(65) Prior Publication Data

US 2017/0318417 A1    Nov. 2, 2017

(51) Int. Cl.
*H04W 4/02* (2018.01)
*H04W 4/021* (2018.01)

(52) U.S. Cl.
CPC .................. *H04W 4/021* (2013.01)

(58) Field of Classification Search
CPC ..................................................... H04W 4/021
USPC ....... 455/418–420, 421, 414.1, 404.1, 404.2, 455/456.1, 66.1, 67.11, 422.1
See application file for complete search history.

(56) References Cited

U.S. PATENT DOCUMENTS

| | | | |
|---|---|---|---|
| 8,149,110 B2 | 4/2012 | Troxler | |
| 8,369,838 B2* | 2/2013 | Mallavarapu | H04M 1/72577 340/426.19 |
| 9,066,210 B2* | 6/2015 | Kalita | H04W 4/04 |
| 2003/0134626 A1* | 7/2003 | Himmel | H04M 1/642 455/419 |
| 2007/0293996 A1* | 12/2007 | Mori | G01C 21/005 701/23 |
| 2010/0224732 A1 | 9/2010 | Olson et al. | |
| 2011/0071914 A1* | 3/2011 | Beasley | G06Q 20/105 705/21 |
| 2013/0337838 A1* | 12/2013 | Kolodziej | G06F 17/3087 455/456.3 |
| 2014/0018979 A1 | 1/2014 | Goossen et al. | |
| 2014/0330457 A1* | 11/2014 | Papadopoulos | B64G 1/002 701/3 |

(Continued)

FOREIGN PATENT DOCUMENTS

| | | |
|---|---|---|
| CN | 204316545 U | 5/2015 |
| FR | 3012423 | 5/2015 |
| JP | WO2004/008660 | 1/2004 |

OTHER PUBLICATIONS

Carl Danley, Control the AR Drone over LTE, https://carldanley.com/control-the-ar-drone-over-lte/, Tutorial, Apr. 7, 2014, 7 pages.

(Continued)

*Primary Examiner* — Cong Tran

(57) ABSTRACT

A restricted zone monitoring system and associated methods are disclosed. The restricted zone monitoring system can include a connection to a network that includes cellular device location information. The restricted zone monitoring system can also include a restricted zone database including information defining one or more restricted zones. In addition, the restricted zone monitoring system can include a processor that compares the cellular device location information to the restricted zone database to determine whether a cellular device is located in a restricted zone.

16 Claims, 2 Drawing Sheets

(56) References Cited

U.S. PATENT DOCUMENTS

| | | | |
|---|---|---|---|
| 2014/0331272 A1* | 11/2014 | Gupta | H04L 63/20 726/1 |
| 2015/0254988 A1 | 9/2015 | Wang et al. | |
| 2015/0339931 A1* | 11/2015 | Yu | G05D 1/0214 701/122 |
| 2016/0005318 A1 | 1/2016 | Wang et al. | |
| 2016/0073261 A1* | 3/2016 | Hughes, Jr. | H04L 63/105 455/411 |
| 2016/0240087 A1* | 8/2016 | Kube | G08G 5/006 |
| 2016/0253907 A1* | 9/2016 | Taveira | G08G 5/006 701/3 |
| 2017/0072812 A1* | 3/2017 | Von Novak | B60L 11/1868 |
| 2017/0255194 A1* | 9/2017 | Poornachandran | G08G 5/006 |

OTHER PUBLICATIONS

Egeland, Cellular controlled RC Plane / Drone. 4G LTE / 3G Telemetry, Gamepad, Raspberry Pi, gStreamer, YouTube, https://www.youtube.com/watch?v=EjAuPoiAmHE, Aug. 6, 2015, 6 pages.
Raspberry PI Foundation, drone/uav control via 3g/4g cellular connection, https://www.raspberrypi.org/forums/viewtopic.php?f=37&t=122965, Raspberry Pi Foundation Forums, Oct. 11, 2015, 3 pages.

* cited by examiner

CELLULAR ENABLED RESTRICTED ZONE MONITORING

BACKGROUND

Commercial unmanned aircraft systems (UAS), also known as drones and unmanned aerial vehicles (UAV), have proliferated in domestic airspace. Because such aircraft pose a danger to the public if unintentionally flown too close to airport flight paths and runways, the FAA imposes rules and regulations on UAS operation that includes requiring an operator to keep a UAS in sight, fly the UAS under 400 feet elevation, and avoid populated areas and airports, as well as other "restricted areas." Current regulations do not require any form of "active identification" on commercial or other drones. Similar conditions exist when it comes to restricted areas for unmanned land-based vehicles (e.g., cars/trucks, robotic devices, etc.) and water-based vehicles (e.g., ships, boats, etc.).

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
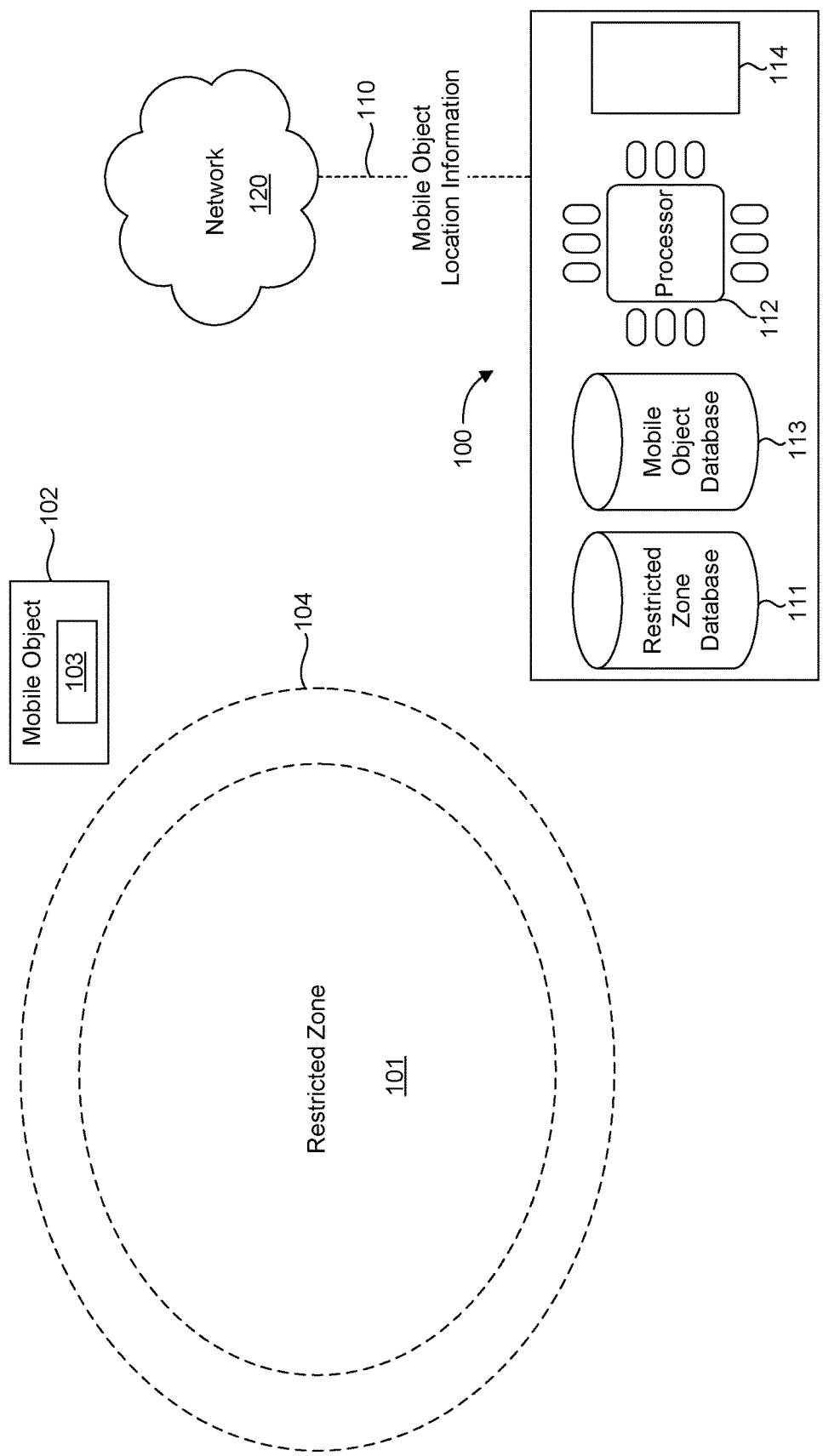
FIG. 1 is an example schematic illustration of a restricted zone monitoring system in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Although the FAA rules and regulations on UAS operation are designed to protect public safety, there is currently no system in place for their enforcement. Public safety objectives can therefore benefit from technology that can prevent or remedy the intentional breach (e.g., deliberate and hostile actions) or unintentional breach (e.g., inadvertent, incidental, or accidental actions) of restricted airspace by a UAS. Similar benefits can be had regarding land-based and/or water-based restricted areas or zones, and as such these are contemplated herein.

Accordingly, a restricted zone monitoring system is disclosed that monitors a location of a land, air or water-based mobile object (e.g., an unmanned aircraft system or UAS, an unmanned aerial vehicle or UAV, an unmanned motor vehicle, robotic device, etc., an unmanned boat, ship, etc. capable of navigating rivers, lakes, oceans, etc.) and determines whether the mobile object is located in a restricted zone (e.g., a near an airport, near a military base, near restricted navigable waters (e.g., a dam), etc.). In one aspect, the system can utilize cellular communication technology with or without navigation technology (also known as GNSS) to monitor the mobile object. The restricted zone monitoring system can include a connection to a network that includes cellular device location information. The restricted zone monitoring system can also include a restricted zone database including information defining one or more restricted zones. In addition, the restricted zone monitoring system can include a processor that compares the cellular device location information to the restricted zone database to determine whether a cellular device is located in a restricted zone.

In one aspect, a method for monitoring a restricted zone is provided that can comprise receiving a location of a remotely located cellular device, comparing the location of the cellular device to a restricted zone, and identifying a breach by determining whether the location of the cellular device is in the restricted zone.

In another aspect, a method for facilitating monitoring of a restricted zone is provided that can comprise obtaining a location of a cellular device, and providing the location of the cellular device to a monitor.

One embodiment of a restricted zone monitoring system 100 is schematically illustrated in FIG. 1, which also illustrates a restricted zone 101 and a mobile object 102 that may be monitored. The restricted zone monitoring system 100 can include a connection 110 to a network 120. The network 120 can include or have access to location information for mobile objects, which can be acquired by, or provided to, the restricted zone monitoring system 100. In one aspect, discussed in more detail below, the network 120 can include or have access to location information of cellular devices that are associated with mobile objects, such as a cellular device 103 included with or otherwise associated with the mobile object 102. The restricted zone monitoring system 100 can also include a restricted zone database 111 that includes information defining one or more restricted zones, and a processor 112 that compares the cellular device location information to the restricted zone database 111 to determine whether the cellular device 103, and therefore the mobile object 102, is located in the restricted zone 101. As described herein, if the mobile object 102 is determined to be located within the restricted zone 101, actions can be taken to remove the mobile object 102 from the restricted zone 101 or otherwise neutralize any threat that may be posed by the mobile object 102 due to its presence in the restricted zone 101.

The processor 112 can include one or more processors, such as a programmable processor (e.g., a central processing unit (CPU)). The processor 112 can be operatively coupled to a non-transitory computer readable medium. The non-transitory computer readable medium can store logic, code, and/or program instructions executable by the processor 112 for performing one or more steps. The non-transitory computer readable medium can include one or more memory units (e.g., removable media or external storage such as an SD card or random access memory (RAM)) that can store logic, code, and/or program instructions executable by the processor 112 to perform any suitable embodiment of the methods described herein. For example, the processor 112 can be configured to execute instructions to compare the cellular device location information to the restricted zone database 111 to determine whether the cellular device 103 is located in the restricted zone 101. In some embodiments, the memory units of the non-transitory computer readable medium can be used to store the processing results produced by the processor 112. Any suitable technique or method can be used to determine whether the cellular device 103 is located in the restricted zone 101.

The systems, devices, and methods described herein can be applied to a wide variety of mobile objects. A mobile object of the present disclosure can be configured to move within any suitable environment, such as in air (e.g., a fixed-wing aircraft, a rotary-wing aircraft, or an aircraft having neither fixed wings nor rotary wings), in or on water (e.g., a ship or a submarine), on ground (e.g., a motor vehicle, such as a car, truck, bus, van, motorcycle, bicycle; a movable structure or frame such as a stick, fishing pole; a robotic device; or a train), under the ground (e.g., a subway), in space (e.g., a spaceplane, a satellite, or a probe), or any combination of these environments. The mobile object 102 can be a vehicle, such as a vehicle described elsewhere herein. In some embodiments, the mobile object 102 can be carried by a living subject, or take off from a living subject, such as a human or an animal.

The mobile object 102 may be capable of moving freely within the environment with respect to six degrees of freedom (e.g., three degrees of freedom in translation and three degrees of freedom in rotation). Alternatively, the movement of the mobile object 102 can be constrained with respect to one or more degrees of freedom, such as by a predetermined path, track, or orientation. The movement can be actuated by any suitable actuation mechanism, such as an engine or a motor. The actuation mechanism of the mobile object 102 can be powered by any suitable energy source, such as electrical energy, magnetic energy, solar energy, wind energy, gravitational energy, chemical energy, nuclear energy, or any suitable combination thereof. The mobile object 102 may be self-propelled via a propulsion system, which may optionally run on an energy source, such as electrical energy, magnetic energy, solar energy, wind energy, gravitational energy, chemical energy, nuclear energy, or any suitable combination thereof. Alternatively, the mobile object 102 may be carried by a living being.

In some instances, the mobile object 102 can be a vehicle, and in many cases an unmanned vehicle. Suitable vehicles may include water vehicles, aerial vehicles, space vehicles, or ground/land vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons), and others. Water-based vehicles can be ships, boats, and others. Land vehicles can include a motor vehicle, such as a car, truck, bus, van, motorcycle, bicycle; a movable structure or frame such as a stick, fishing pole; a robotic device; a train; an under the ground vehicle (e.g., a subway); and others. Space vehicles can include a spaceplane, a satellite, a probe, and others.

A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the mobile object to take off from a surface, land on a surface, maintain its current position and/or orientation (e.g., hover), change orientation, and/or change position.

The mobile object 102 can be controlled remotely by a user or controlled locally by an occupant within or on the mobile object 102. In some embodiments, the mobile object 102 is an unmanned mobile object, such as a UAS (e.g., a UAV or a drone), an unmanned ground vehicle (UGV), an unmanned surface vehicle (USV), etc. An unmanned mobile object may not have an occupant onboard the mobile object. The mobile object 102 can be controlled by a human or an autonomous control system (e.g., a computer control system), or any suitable combination thereof. The mobile object 102 can be an autonomous or semi-autonomous robot, such as a robot configured with an artificial intelligence.

The mobile object 102 can have any suitable size and/or dimension. In some embodiments, the mobile object 102 may be of a size and/or dimensions to have a human occupant within or on the mobile object 102. Alternatively, the mobile object 102 may be of size and/or dimensions smaller than that capable of having a human occupant within or on the mobile object 102. The mobile object 102 may be of a size and/or dimensions suitable for being lifted or carried by a human. Alternatively, the mobile object 102 may be larger than a size and/or dimensions suitable for being lifted or carried by a human.

Figure 2:
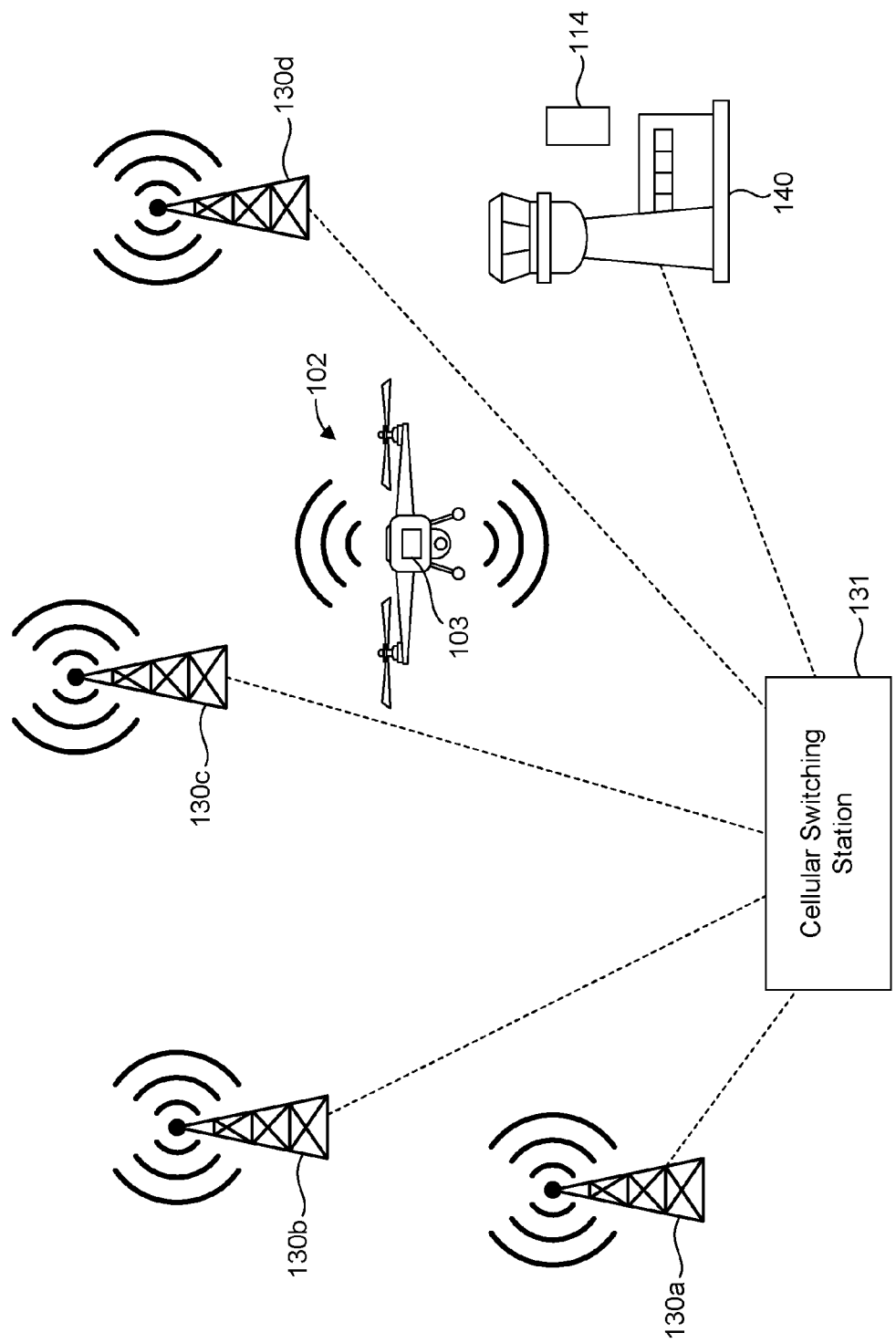
FIG. 2 is a schematic illustration showing aspects of a cellular network that can be utilized for monitoring a restricted zone in accordance with an example of the present disclosure.

As mentioned above, the mobile object 102 can include or be associated with the cellular device 103. Utilizing cellular communication device technology on-board or associated with the mobile object 102 can enable use of existing cell phone infrastructure to actively locate, track monitor and take action with respect to mobile objects in an area of concern, such as the restricted zone 101. For example, FIG. 2 illustrates a cellular network 120 that includes base stations 130a-d in communication with a switching station 131. The base stations 130a-d are located systematically to provide cellular coverage for many geographic locations, such as about population centers and airports. The cellular network 120 can determine a location of a cellular device, which is referred to as localization or positioning. Utilizing cellular network or GNSS technology, the location of the cellular/mobile device 103, and therefore the location of the mobile object 102 associated with the cellular device 103, can be actively tracked and monitored within an area or region that is covered by the cellular network 120. Although the mobile object 102 is depicted in FIG. 2 as an aircraft (e.g., a UAS), this depiction is not intended to be limiting, and the mobile object 102 in FIG. 2 can be any suitable type of mobile object as discussed above. The cellular device 103 can be associated with the mobile object 102 in any suitable manner.

Localization of the cellular device 103 may occur by any suitable technique, such as via a cellular network-based technique (e.g., multilateration of radio signals between radio towers of the network and the cellular device), and/or via a cellular device-based technique (e.g., satellite positioning, such as GPS and GLONASS). To locate the cellular device 103 using multilateration of radio signals, the cellular device 103 emits at least a roaming signal to contact the next nearby antenna tower (e.g., cellular base station), but the process does not require an active call. The wireless communication is based on the cellular device's 103 signal strength to nearby cellular base stations. Mobile positioning may include location-based services that disclose the actual coordinates of the cellular device 103, which is a technology used by telecommunication companies that can approximate the location of the cellular device 103, and thereby also the location of the mobile object 102 associated with the cellular device 103. Thus, tracking the cellular device 103 can also occur by having the cellular device 103 attain its GPS-location directly from satellites, and then having the information sent via the cellular network 120 to the system 100 for tracking the cellular device 103 relative to the restricted zone 102, as illustrated in FIG. 1. Using the SIM in $2^{nd}$, $3^{rd}$, $4^{th}$ and future generations of cellular devices, it is possible to obtain raw radio measurements from the cellular device 103. Available information includes the serving Cell ID, round-trip time, and signal strength. Observed Time Difference of Arrival (OTDOA), enhanced Cell ID (eCID), and/or E-UTRA positioning network architecture can also be utilized to locate the cellular device 103. Hybrid positioning or location systems can use a combination of network-based and cellular device-based technologies for location determination. For example, assisted GPS (A-GPS) can use GPS and cellular network information to determine the cellular device 103 location. Hybrid-GNSS or GNSS and mobile radio cellular positioning like OTDOA can also be utilized. Another hybrid technique combines Global Navigation Satellite Systems (GNSS), such as GPS and GLONASS, with Wi-Fi positioning systems. Some hybrid positioning systems combine several different location finding approaches to position mobile devices by Wi-Fi, WMAX, GSM, LTE, IP addresses, and network environment data. In addition, control plane (C-Plane) and user plane (U-Plane) session handling (e.g., LPP, SUPL 2.0) can be utilized to determine the cellular device 103 location. Thus, any location positioning protocol or service can be utilized to determine the location of the cellular device 103, such as satellite positioning (e.g., A-GNSS, GPS, and GLONASS), mobile radio cellular positioning (e.g., OTDOA and eCID), hybrid satellite and mobile radio cellular positioning (e.g., hybrid-GNSS and GNSS OTDOA), C-Plane and U-Plane session handling (e.g., LPP and SUPL 2.0), signaling location based services (E-UTRA positioning network architecture), etc.

Cellular devices typically have unique identifiers, such as an International Mobile Station Equipment Identity (IMEI) for GSM devices or an Electronic Serial Number (ESN) for CDMA devices. A specific cellular device can therefore be identified and located. Unique cellular device identifiers can also be used to supply relevant information pertaining to the mobile object 102 associated with the cellular device 103 (e.g., owner/operator, vehicle type, vehicle model, etc.). In one aspect, cellular technology associated with the mobile object 102 can continuously transmit its location and other relevant information to the cellular base stations 130a-d in the region where the mobile object 102 is operating. Thus, existing cellular communication technology and infrastructure can be used to actively identify the mobile object 102 and the mobile object's location in a space-volume area of interest or concern (e.g., about, or relative to, the restricted zone 101), as well as information about the mobile object 102, such as the owner/operator of the mobile object 102, thereby enabling the ability to determine and actively track the location of the mobile object 102 that is within a region covered by the cellular network 120.

Accordingly, in one aspect, the restricted zone monitoring system 100 illustrated in FIG. 1 can include a mobile object database 113 that includes cellular device identification of mobile objects equipped with cellular devices or cellular capabilities. The processor 112 can compare the cellular device location information of the cellular devices in the mobile object database 111 to determine whether the mobile object 102 equipped with the cellular device 103 is located in the restricted zone 101. In a particular aspect, the mobile object database 113 can comprise a vehicle database that includes cellular device identification of unmanned vehicles (e.g., aerial vehicles, land vehicles, and/or water vehicles) equipped with cellular devices. Such a database can provide a "watch list" for cellular devices to be monitored.

The restricted zone 101 may comprise any location, which can be defined in any suitable manner. In some instances, the restricted zone 101 location may be a point, or the center or location of the restricted zone 101 may be designated by a point (e.g., latitude and longitude coordinates, optionally altitude coordinate). For example, the restricted zone 101 location may be a point at the center of an airport, or representative of the airport or other type of restricted zone. In other examples, the restricted zone 101 location may include an area or region, which can have any shape (e.g., a rounded shape, a rectangular shape, a triangular shape, a shape corresponding to one or more natural or man-made feature at the location, a shape corresponding to one or more zoning rules, or any other boundary). For example, the restricted zone 101 may be the boundaries of an airport or other type of flight-restricted region. In another example, the restricted zone 101 can comprise restricted navigable waters. In still another example, the restricted zone 101 can comprise a restricted location or area on land or under the ground. In some instances, the restricted zone 101 may include a space. The space may be a three-dimensional space that includes latitude, longitude, and/or altitude coordinates. The three-dimensional space may include length, width, and/or height. The restricted zone 101 may include space from the ground up to any altitude above the ground. This may include altitude straight up from one or more restricted zones on the ground. For example, for some latitudes and longitudes, all altitudes may be flight restricted. In some instances, some altitudes for particular lateral regions may be flight-restricted, while others are not. For example, for some latitudes and longitudes, some altitudes may be flight restricted while others are not. Thus, the restricted zone 101 may have any number of dimensions, and measurement of dimensions, and/or may be designated by these dimension locations, and/or by a space, area, line, point, and/or structure (e.g., a building, wall, or fence) representative of the restricted zone.

In one specific aspect, the restricted zone 101 may include one or more locations where unauthorized aerial vehicles may not fly. Flight-restricted regions may include prohibited airspace, which may refer to an area (or volume) of airspace within which flight of aircraft is not allowed, usually due to security concerns. Prohibited areas may contain airspace of defined dimensions identified by an area on the surface of the earth within which the flight of aircraft is prohibited. Such areas can be established for security or other reasons associated with the national welfare. These areas may be published in the Federal Register and may be depicted on aeronautical charts in the United States, or in other publications in various jurisdictions. A flight-restricted region may include special use airspace (e.g., where limitations may be imposed on aircraft not participating in designated operations), such as restricted airspace (i.e., where entry is typically forbidden at all times from all aircraft and is not subject to clearance from the airspace's controlling body), military operations areas, warning areas, alert areas, temporary flight restriction (TFR) areas, national security areas, and/or controlled firing areas. Examples of flight-restricted regions may include, but are not limited to, airports, flight corridors, military or other government facilities, locations near sensitive personnel (e.g., when the United States President or other leader is visiting a location), nuclear sites, research facilities, private airspace, de-militarized zones, certain jurisdictions (e.g., townships, cities, counties, states/provinces, countries, bodies of water or other natural landmarks), or other types of no-fly zones. A flight-restricted region may be a permanent no-fly zone or may be a temporary area where flight is prohibited. In some instances, a list of flight-restricted regions may be updated. Flight-restricted regions may vary from jurisdiction to jurisdiction. For instance, some states or counties may include schools as flight-restricted regions while others may not. While detail has been provided regarding restricted zones for aerial vehicles or mobile objects, those skilled in the art will recognize that similar restricted areas can be specifically delineated for navigable water locations/areas, and land/ground or underground locations/areas.

In one aspect, one or more buffer or proximity zones 104 can be defined about at least a portion of the restricted zone 101. The cellular device 103 can also be monitored to determine whether the mobile object 102 is located in the proximity zone 104, which can provide an advance warning of a potential breach of the restricted zone 101.

The technology of the present disclosure can be applied to any three-dimensional space, such as the airspace about a school, a hospital, etc., which may be desirable to maintain free of intrusions by unwanted aircraft. This technology can also be extended to the tracking of any cellular device in three-dimensional space, which may be independent of a UAS. For example, a cellular device carried by a pilot or passenger of a hot air balloon may be identified and tracked to determine whether a threat exists about a given airspace.

In one aspect, monitoring of the restricted zone 101 can be facilitated by obtaining a location of the cellular device 103, and providing the location of the cellular device to a monitor 140 (see FIG. 2). These activities can be performed, for example, by a cellular network provider. Although the monitor 140 is depicted in FIG. 2 as air traffic control, this depiction is not intended to be limiting, and the monitor 140 can comprise any individual or organization, as well as a machine (e.g., computer hardware and/or computer software). Communication between the monitor 140 (e.g., utilizing a communication device 114) and the cellular device 103 can also be facilitated. Communication may be two-way communications and/or one-way communications and may occur directly and/or indirectly between the monitor 140 and the cellular device 103. Communications may occur over a telecommunications network (e.g., 3G, 4G, etc.), a local area network (LAN), wide area network (WAN) such as the Internet, cloud environment, WiFi, Bluetooth, radiofrequency (RF), infrared (IR), or any other communications technique.

In one aspect, the restricted zone 101 can be monitored by receiving a location of a remotely located cellular device 103 and/or position tracking device, comparing the location of the cellular device 103 to the restricted zone 101, and identifying a breach by determining whether the location of the cellular device 103 is in the restricted zone 101. These activities can be performed by the monitor 140, such as a person and/or a machine (e.g., computer hardware and/or computer software). The monitor 140 may include and/or utilize the restricted zone monitoring system 100 of FIG. 1. In some cases, the monitor 140 can comprise an individual or an organization. The monitor 140 may monitor the restricted zone 101 based on proximity to the monitor 140 and/or based on a given geographic region or jurisdiction.

Once a breach has been identified, the monitor 140 can take action to remedy the breach. In one aspect, the monitor 140 can facilitate remedying the breach, such as by communicating the breach and the location of the cellular device 103 to a third party that may take action to remedy the breach. For example, location information can be analyzed and relayed to ground or airborne controllers for subsequent actions if needed. In another aspect, the breach can be remedied by communicating with the cellular device 103, which can lead to communication with the owner/operator of the mobile object 102. The system 100 of FIG. 1 can therefore include the communication device 114 operable to communicate with the cellular device 103. Communication with the owner/operator of the mobile object 102 can occur via the cellular device 103 and/or via another communication channel facilitated by the cellular network, and can be one-way or two-way communication. In one aspect, communication with the owner/operator of the mobile object 102 can include an alert that the mobile object is located near the restricted zone 101 (i.e., located within the proximity zone 104) or within the restricted zone 101. The cellular device 103 can be used to alert the owner/operator of the mobile object 102 in any suitable manner, such as via a mobile application, a flight status indicator, an audio indicator, or any other suitable indicator that may be associated with the owner/operator (e.g., a remote control for the mobile object 102). In other examples, the alert may be provided via the mobile object 102 itself, such as by a flashing light, certain audio tones or noise emitted by the mobile object 102. Communication with the owner/operator of the mobile object 102 can provide the owner/operator with a time period in which to remove the mobile object 102 from restricted zone 101 and/or the proximity zone 104. In the case of a flying mobile object or aerial vehicle, such communication can include an instruction to land the mobile object. Thus, an authority can communicate with the operator of a UAS via the cellular network and the cellular technology on the UAS to inform the operator of the need to move the UAS to a safe location. Communication with the owner/operator can be combined with other responses discussed below.

In one aspect, a breach of the proximity zone 104 and/or the restricted zone 101 can be remedied by remotely controlling the mobile object 102, such as by maneuvering the mobile object 102 to a location outside the restricted zone 101. This response can occur after providing an alert to the owner/operator of the mobile object 102, such as providing a time period in which to remove the mobile object 102 from the proximity zone 104 and/or restricted zone 101 after which control of the mobile object 102 will be taken away from the operator/owner of the mobile object 102. Such non-cooperative control of the mobile object 102 precludes or supersedes control of the mobile object 102 by the owner/operator, which will eliminate user autonomy in controlling the mobile object 102 but may provide greater compliance with regulations and provide greater safety measures. In the case of a flying mobile object or aerial vehicle, the breach can be remedied by flying the aerial vehicle to a location outside the restricted zone 101 and/or landing the aerial vehicle. Thus, if necessary, designated federal/local authorities can take control of a UAS (e.g., through an official channel). The cellular device 103 can be embedded within the mobile object 102, such as by being integrated with or connected to a control subsystem of the mobile object 102, which can facilitate remote control of the mobile object 102 (e.g., by the monitor 140).

In one aspect, the mobile object 102 can be remotely controlled via the communication device 114. In one aspect, the communication device 114 can communicate with the cellular device 103 to control the mobile object 102, such as by transmitting control data that can control the motion of the mobile object. For example, the communication device 114 may provide instructions (e.g., in real-time) to the mobile object 102 that may control the movement of the mobile object 102. The communication device 114 may operate other functions of the mobile object 102, such as one or more settings of the mobile object 102, one or more sensors, operation of one or more payloads, operation of a carrier of the payload, or any other operations of the mobile object 102. The mobile object 102 may provide data to the communication device 114. The data may include information about the location of the mobile object 102, data sensed by one or more sensors of the mobile object 102, images captured by the mobile object 102, or other data from the mobile object 102. The instructions from the communication device 114 and/or data from the mobile object 102 may be transmitted simultaneously or sequentially. They may be transferred over the same communication channel or different communication channels.

A monitor may set up waypoints for navigation of the mobile object 102. The waypoints may have predefined locations (e.g., coordinates) that can be followed to navigate from one location to another or follow a path. In some instances, the monitor may enter waypoints using software. For example, a monitor may enter coordinates for way points and/or use a graphical user interface, such as a map, to designate waypoints.

In one aspect, the breach can be remedied by destroying the mobile object 102. This can be accomplished by firing a projectile or a self-propelled weapon (e.g., a missile or a rocket) at the mobile object 102. Thus, for example, utilizing the cellular network 120, an authority can take control of a threatening UAS to move the UAS to a safe location or land the UAS. If unresponsive, the UAS may be neutralized using force to destroy the UAS and end the threat.

The response measure for remedying a breach may be determined by the location of the mobile device 102 without taking the mobile device's direction or any other information into account. Alternatively, other information, such as the direction the mobile object 102 is traveling may be taken into account when determining how to respond to a breach. Different actions may be taken based on the relative position of the mobile object 102 to the restricted zone 101. For example, when the mobile object 102 is located in the proximity zone 104 and not too close to the restricted zone 101, the owner/operator may be permitted to take corrective action with minimal external interference. On the other hand, when the mobile object 102 is located too close or within the restricted zone 101, greater interference with the owner/operator's control of the mobile object 102 may be encountered. For example, the monitor 140 may take external, non-cooperative control of the mobile object 102 to enforce regulations and provide greater safety.

It is noted that no specific order is required in the methods disclosed herein, though generally in some embodiments, method steps can be carried out sequentially.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A restricted zone monitoring system, comprising:
    a connection to a network that includes cellular device location information;
    a restricted zone database including information defining one or more restricted zones;
    a vehicle database including cellular device identification of vehicles equipped with cellular devices; and
    a processor that compares the cellular device location information of the cellular devices in the vehicle database to the restricted zone database to determine whether a vehicle equipped with a cellular device is located in a restricted zone.

2. The system of claim 1, further comprising a communication device operable to communicate with the cellular device.

3. The system of claim 1, wherein the vehicle database includes cellular device identification of unmanned vehicles equipped with cellular devices or cellular capabilities.

4. The system of claim 3, wherein the unmanned vehicles include at least one of aerial, water and land vehicles.

5. A method for monitoring a restricted zone, comprising:
receiving a location of a remotely located cellular device;
determining whether a vehicle is equipped with the cellular device;
comparing the location of a vehicle equipped with the cellular device to a restricted zone; and
identifying a breach by determining whether the location of a vehicle equipped with the cellular device is in the restricted zone.

6. The method of claim 5, further comprising facilitating remedying the breach.

7. The method of claim 6, wherein facilitating remedying the breach comprises communicating the breach and the location of the cellular device to a third party.

8. The method of claim 5, further comprising remedying the breach.

9. The method of claim 8, wherein remedying the breach comprises communicating with the cellular device.

10. The method of claim 8, wherein remedying the breach comprises at least one of landing the vehicle, stopping the vehicle and maneuvering the vehicle to a location outside the restricted zone.

11. The method of claim 8, wherein remedying the breach comprises communicating with an owner of the vehicle.

12. The method of claim 8, wherein remedying the breach comprises destroying the vehicle.

13. The method of claim 8, wherein remedying the breach comprises operating the vehicle.

14. The method of claim 13, wherein operating the vehicle comprises maneuvering the vehicle to a location outside the restricted zone.

15. The method of claim 5, wherein the vehicle is unmanned.

16. The method of claim 5, wherein the vehicle comprises one of an aerial vehicle, a water vehicle, and a land vehicle.

* * * * *